US012754469B2

(12) United States Patent
Wang et al.

(10) Patent No.: US 12,754,469 B2
(45) Date of Patent: Oct. 6, 2026

(54) ILLUMINATION SYSTEM AND PROJECTION DEVICE

(71) Applicant: Qisda Corporation, Taoyuan City (TW)

(72) Inventors: Kai-Jiun Wang, Taoyuan City (TW); Ching-Tze Huang, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 260 days.

(21) Appl. No.: 18/803,343

(22) Filed: Aug. 13, 2024

(65) Prior Publication Data

US 2025/0088612 A1 Mar. 13, 2025

(30) Foreign Application Priority Data

Sep. 7, 2023 (CN) ......................... 202311152576.5

(51) Int. Cl.
*G03B 21/20* (2006.01)
*H04N 9/31* (2006.01)

(52) U.S. Cl.
CPC ..... *G03B 21/2066* (2013.01); *G03B 21/2013* (2013.01); *G03B 21/208* (2013.01); *H04N 9/3164* (2013.01)

(58) Field of Classification Search
CPC .. G03B 21/2066; G03B 21/208; G03B 21/20; G03B 21/2013; H04N 9/3111; H04N 9/3158; H04N 9/3164; H04N 9/3152; G02B 27/141
USPC ............................................................ 353/99
See application file for complete search history.

(56) References Cited

U.S. PATENT DOCUMENTS

| | | | | |
|---|---|---|---|---|
| 2021/0286248 | A1* | 9/2021 | Lin | G02B 27/1006 |
| 2021/0341824 | A1* | 11/2021 | Lin | G03B 21/208 |
| 2022/0365413 | A1* | 11/2022 | Wang | G03B 21/142 |
| 2023/0062472 | A1* | 3/2023 | Hsu | G03B 21/2013 |
| 2024/0171713 | A1* | 5/2024 | Chen | G03B 21/2013 |
| 2024/0248290 | A1* | 7/2024 | Chang | G02B 27/141 |

FOREIGN PATENT DOCUMENTS

| | | |
|---|---|---|
| CN | 211403092 | 9/2020 |

* cited by examiner

*Primary Examiner* — Magda Cruz
(74) *Attorney, Agent, or Firm* — JCIPRNET

(57) ABSTRACT

An illumination system is provided. The first light guide module is configured to transmit a first to sixth color light beams from the first light source module and the second light source module to the second light guide module. The second light guide module is configured to transmit the first to sixth color light beams from the first light guide module to the condenser lens module. The second light guide module is further configured to separate the first to sixth color light beams respectively into a first sub-light beam and a second sub-light beam, so that an aspect ratio of a light spot formed by the first sub-light beams and the second sub-light beams incident on a light incident surface of the condenser lens module falls within a range of 1 to 1.5. A projection device is also provided.

20 Claims, 7 Drawing Sheets

10

ILLUMINATION SYSTEM AND PROJECTION DEVICE

CROSS-REFERENCE TO RELATED APPLICATION

This application claims the priority benefit of China application serial no. 202311152576.5, filed on Sep. 7, 2023. The entirety of the above-mentioned patent application is hereby incorporated by reference herein and made a part of this specification.

BACKGROUND

Technical Field

The disclosure relates to an optical system and an optical device, and in particular to an illumination system and a projection device.

Description of Related Art

In the past, projection devices usually used blue solid-state light sources with fluorescent color wheels, using blue light to excite phosphors to generate red, yellow, green and other colored lights. Due to the advancement of solid-state light source manufacturing technology, the luminous efficiency of green solid-state light sources has been greatly improved. Therefore, blue solid-state light sources, red solid-state light sources, and green solid-state light sources may be directly used to generate the basic three-color light required by projection devices.

Currently, the solid-state light sources provided by manufacturers on the market package sub-light sources of different colors respectively into a module, and perform dissipation with heat dissipation modules of different sizes or forms to improve the light extraction efficiency of the light source. However, when the projection device uses multiple sets of light sources, such a package design may easily lead to a complex light-combining path structure, and the three-color light may easily cause uneven color distribution in the projection screen due to poor light-combining design.

SUMMARY

The disclosure provides an illumination system and a projection device, which may generate an illuminating light beam and an image beam with more uniformed colors.

An embodiment of the disclosure provides an illumination system configured to generate an illuminating light beam and including a first light source module, a second light source module, a first light guide module, a second light guide module, a condenser lens module, and a light homogenizing element. The first light source module is configured to generate a first color light beam, a second color light beam, and a third color light beam. The second light source module is configured to generate a fourth color light beam, a fifth color light beam, and a sixth color light beam. The first light guide module is disposed on a transmission path of the first to the sixth color light beams. The second light guide module is disposed on the transmission path of the first to the sixth color light beams. The first light guide module is configured to transmit the first to the sixth color light beams from the first light source module and the second light source module to the second light guide module. The condenser lens module is disposed on the transmission path of the first to the sixth color light beams. The second light guide module is configured to transmit the first to the sixth color light beams from the first light guide module to the condenser lens module. The light homogenizing element is disposed on the transmission path of the first to the sixth color light beams. The condenser lens module is configured to transmit the first to the sixth color light beams from the condenser lens module to the light homogenizing element. The first to the sixth color light beams form an illumination light beam after leaving the light homogenizing element. The second light guide module is further configured to separate the first to the sixth color light beams respectively into a first sub-beam and a second sub-beam, so that an aspect ratio of a light spot formed by the first sub-light beams and the second sub-light beams incident on a light incident surface of the condenser lens module falls within a range of 1 to 1.5.

An embodiment of the disclosure provides a projection device configured to generate an image beam and including the illumination system, a light valve, and a projection lens. The lighting system is configured to provide the illuminating light beam, and includes the first light source module, the second light source module, the first light guide module, the second light guide module, the condenser lens module, and the light homogenizing element. The first light source module is configured to generate the first color light beam, the second color light beam, and the third color light beam. The second light source module is configured to generate the fourth color light beam, the fifth color light beam, and the sixth color light beam. The first light guide module is disposed on the transmission path of the first to the sixth color light beams. The second light guide module is disposed on the transmission path of the first to the sixth color light beams. The first light guide module is configured to transmit the first to the sixth color light beams from the first light source module and the second light source module to the second light guide module. The condenser lens module is disposed on the transmission path of the first to the sixth color light beams. The second light guide module is configured to transmit the first to the sixth color light beams from the first light guide module to the condenser lens module. The light homogenizing element is disposed on the transmission path of the first to the sixth color light beams. The condenser lens module is configured to transmit the first to the sixth color light beams from the condenser lens module to the light homogenizing element. The first to the sixth color light beams form the illuminating light beam after leaving the light homogenizing element. The second light guide module is further configured to separate the first to the sixth color light beams respectively into the first sub-beam and the second sub-beam, so that the aspect ratio of the light spot formed by the first sub-light beams and the second sub-light beams incident on the light incident surface of the condenser lens module falls within the range of 1 to 1.5. The light valve is disposed on the transmission path of the illuminating light beam to convert the illuminating light beam into the image beam. The projection lens is disposed on the transmission path of the image beam and is configured to project the image beam out of the projection device.

Based on the above, in an embodiment of the disclosure, the illumination system and the projection device are designed as: the second light guide module is configured to separate the first to the sixth color light beams respectively into the first sub-beam and the second sub-beam, so that the aspect ratio of the light spot formed by the first sub-light beams and the second sub-light beams incident on the light incident surface of the condenser lens module falls within the range of 1 to 1.5. Therefore, when the first sub-beam and the second sub-beam are incident on the light homogenizing element, the angles in each direction are more consistent, so that the light homogenizing element has proper light homogenizing effect, thereby making the color of the illuminating light beam IL and the image beam IB more uniformed and making the energy distribution more consistent.

DESCRIPTION OF THE EMBODIMENTS

Figure 1:
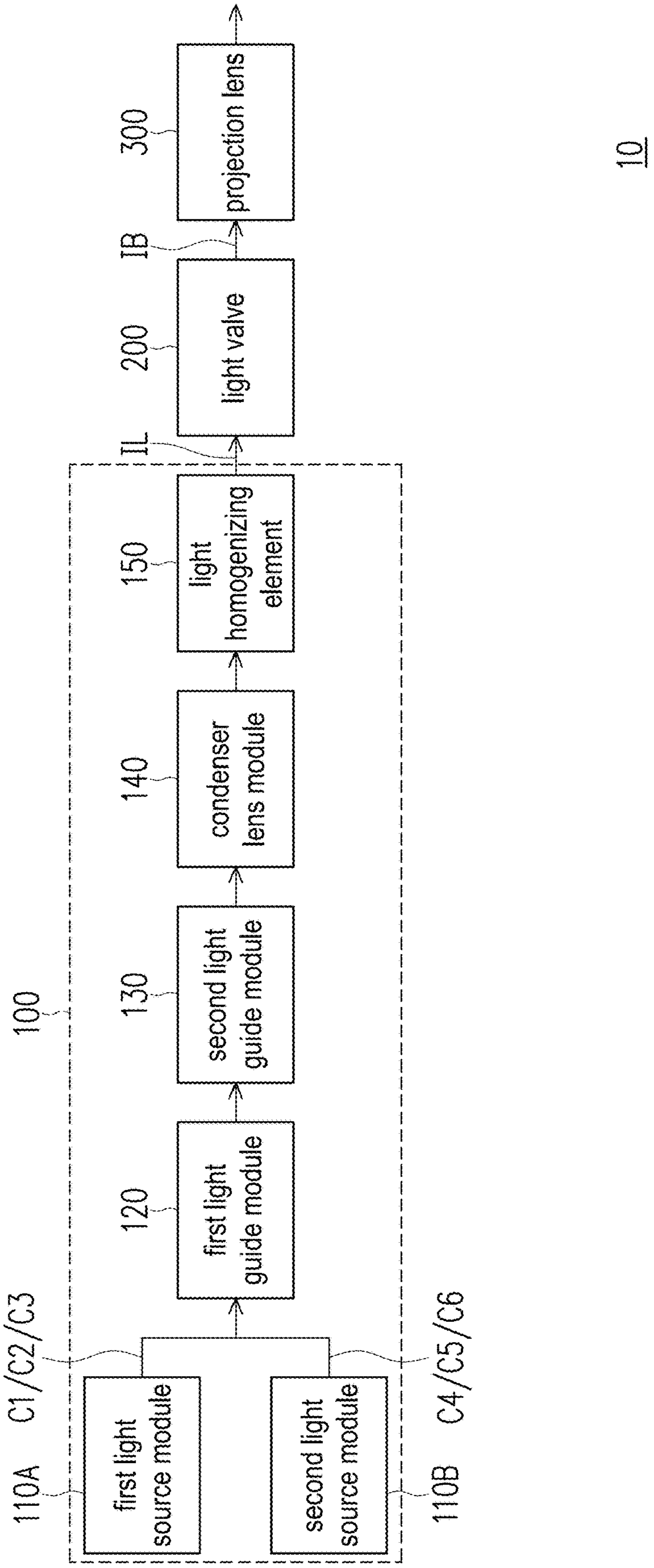
FIG. 1 is a schematic diagram of a projection device according to an embodiment of the disclosure.

FIG. 1 is a schematic diagram of a projection device according to an embodiment of the disclosure. Referring to FIG. 1, an embodiment of the disclosure provides a projection device 10 configured to generate an image beam IB and including an illumination system 100, a light valve 200, and a projection lens 300. The illumination system 100 is configured to provide an illuminating light beam IL. The light valve 200 is disposed on a transmission path of the illuminating light beam IL to convert the illuminating light beam IL into the image beam IB. The projection lens 300 is disposed on a transmission path of the image beam IB to project the image beam IB out of the projection device 10.

In this embodiment, the light valve 200 is, for example, a digital micro-mirror device (DMD), a liquid-crystal-on-silicon panel (LCOS Panel), or a liquid crystal panel or other spatial light modulators. In addition, the projection lens 300 is, for example, a combination including one or more optical lenses with a refractive power. The disclosure does not limit the type and the category of the projection lens 300.

In this embodiment, the illumination system 100 includes a first light source module 110A, a second light source module 110B, a first light guide module 120, a second light guide module 130, a condenser lens module 140, and a light homogenizing element 150. The first light source module 110A is configured to generate a first color light beam C1, a second color light beam C2, and a third color light beam C3. The second light source module 110B is configured to generate a fourth color light beam C4, a fifth color light beam C5, and a sixth color light beam C6. The first light guide module 120 is disposed on a transmission path of the first to the sixth color light beams C1-C6. The second light guide module 130 is disposed on the transmission path of the first to the sixth color light beams C1-C6. The first light guide module 120 is configured to transmit the first to the sixth color light beams C1-C6 from the first light source module 110A and the second light source module 110B to the second light guide module 130. The condenser lens module 140 is disposed on the transmission path of the first to the sixth color light beams C1-C6. The second light guide module 130 is configured to transmit the first to the sixth color light beams C1-C6 from the first light guide module 120 to the condenser lens module 140. The light homogenizing element 150 is disposed on the transmission path of the first to the sixth color light beams C1-C6. The condenser lens module 140 is configured to transmit the first to the sixth color light beams C1-C6 from the condenser lens module 140 to the light homogenizing element 150. The first to the sixth color light beams C1-C6 form the illuminating light beam IL after leaving the light homogenizing element 150.

In this embodiment, the light homogenizing element 150 is, for example, an integration rod, a lens array, or other optical elements with a light homogenizing effect.

Figure 2A:
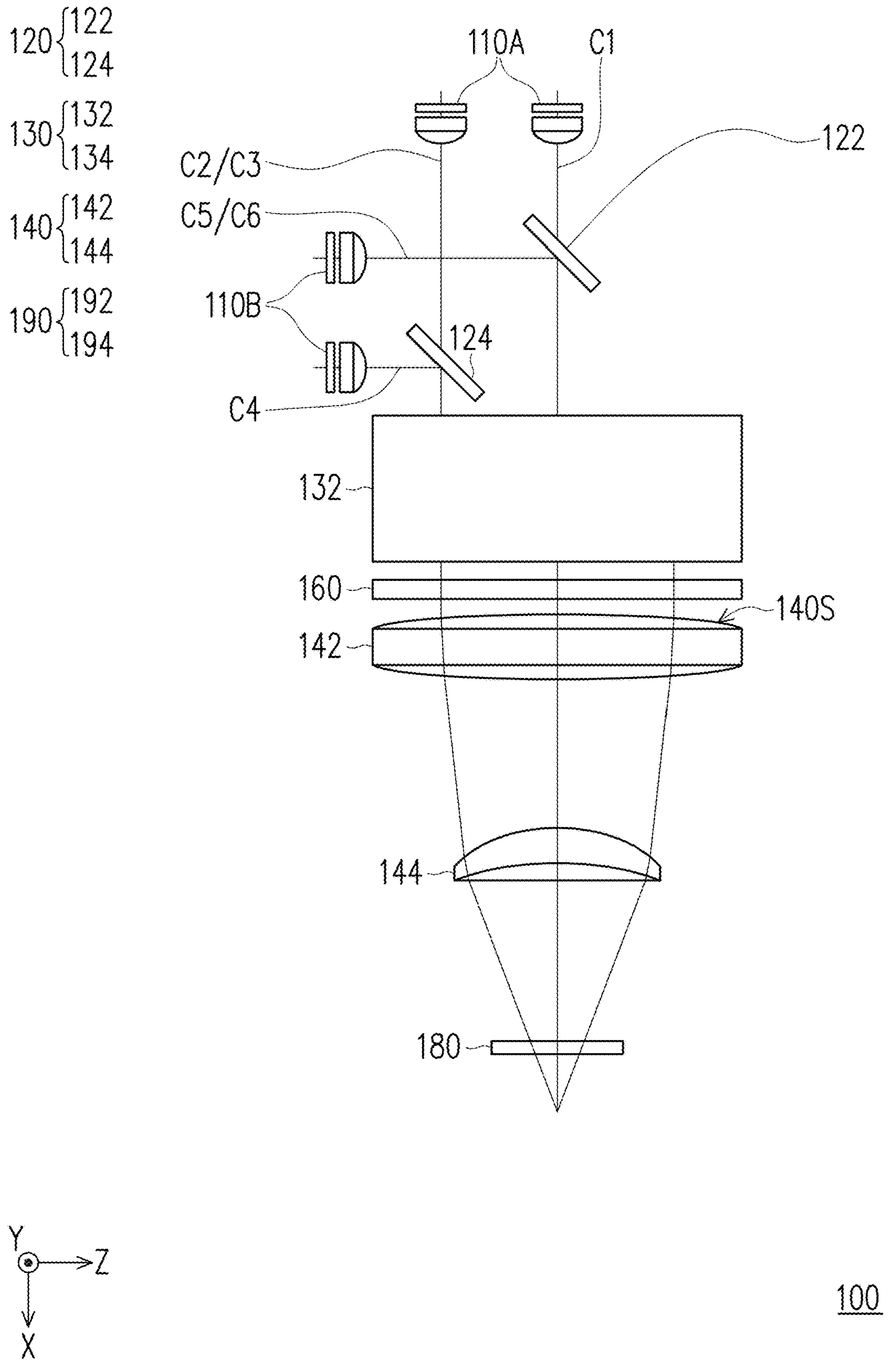
FIG. 2A is a schematic diagram of an illumination system according to the first embodiment of the disclosure.
Figure 2B:
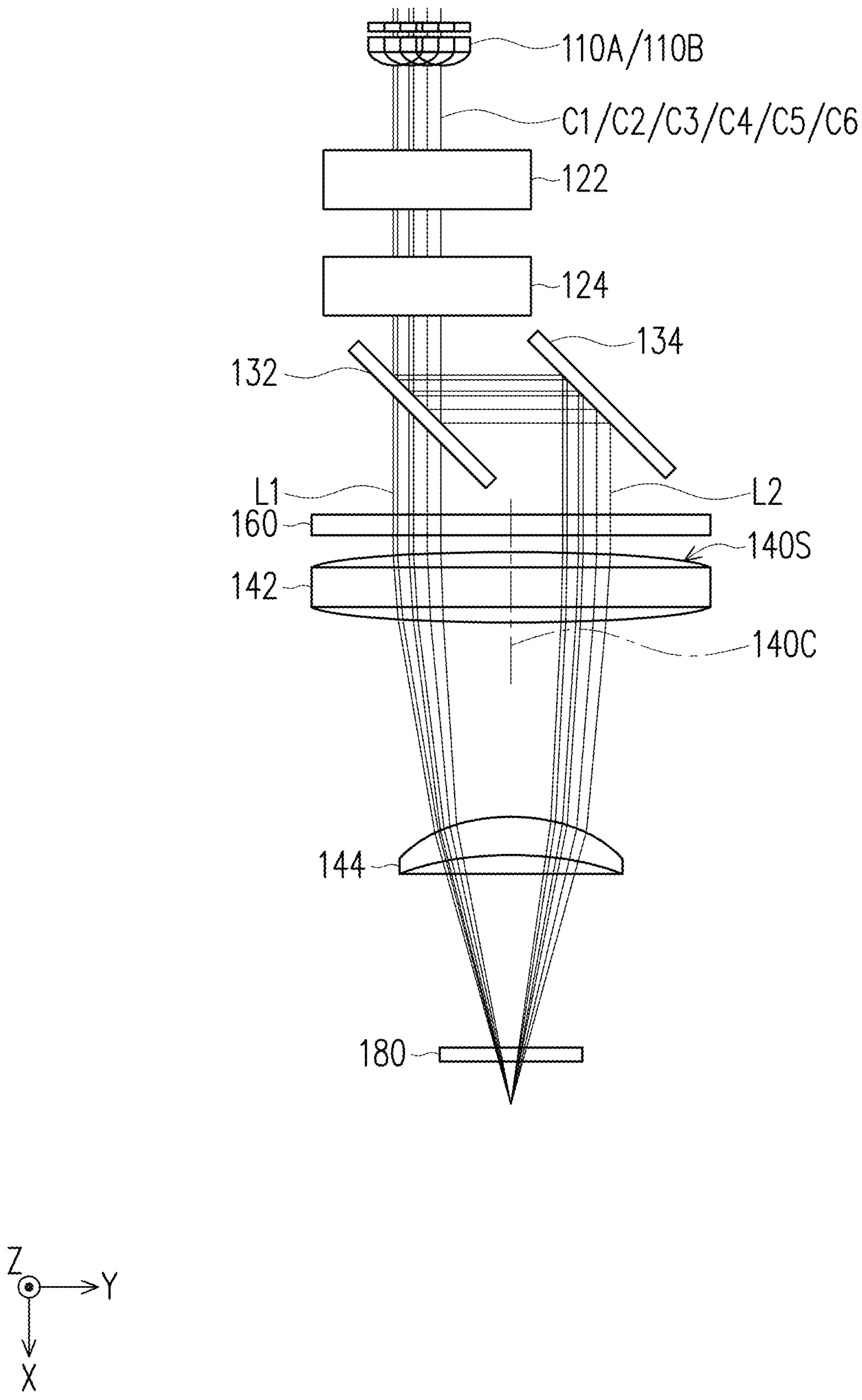
FIG. 2B is a schematic diagram of FIG. 2A from another perspective.
Figure 3:
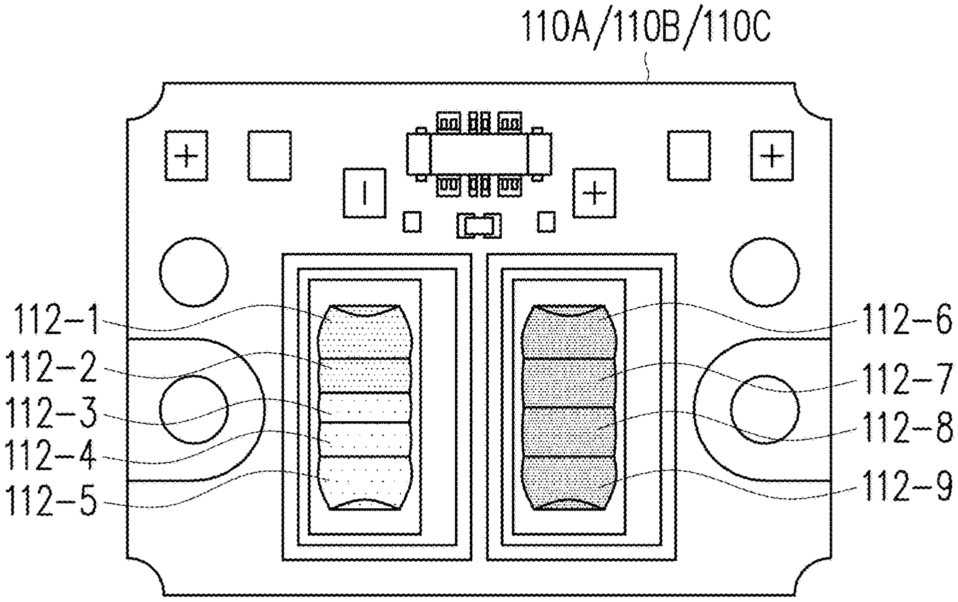
FIG. 3 is a schematic diagram of a light source module in a projection device or an illumination system according to an embodiment of the disclosure.

FIG. 2A is a schematic diagram of an illumination system according to the first embodiment of the disclosure. FIG. 2B is a schematic diagram of FIG. 2A from another perspective. FIG. 3 is a schematic diagram of a light source module in a projection device or an illumination system according to an embodiment of the disclosure. Referring to FIG. 2A, FIG. 2B, and FIG. 3, in this embodiment, the first light source module 110A or the second light source module 110B may include multiple light sources 112-1, 112-2, 112-3, 112-4, 112-5, 112-6, 112-7, 112-8, and 112-9. The light sources 112-1, 112-2, 112-3, 112-4, 112-5, 112-6, 112-7, 112-8, and 112-9 are, for example, a laser diode (LD), light-emitting diode (LED) light source or other suitable light source. The light sources 112-1, 112-2, 112-3, 112-4, 112-5, 112-6, 112-7, 112-8, and 112-9 are arranged in two arrays. The light sources 112-6, 112-7, 112-8, and 112-9 emitting the first color beam C1 are disposed on one of the arrays. The light sources 112-3, 112-4, 112-5 and 112-1, 112-2 emitting the second and the third color beams C2 and C3 are disposed on another one of the arrays. The light sources 112-3, 112-4, 112-5 and 112-1, 112-2 emitting the second and third color beams C2 and C3 are respectively adjacent to each other. Alternatively, the light sources 112-6, 112-7, 112-8, and 112-9 emitting the fourth color beam C4 are disposed on one of the arrays. The light sources 112-3, 112-4, 112-5, and 112-1, 112-2 emitting the fifth and the sixth color beams C5 and C6 are disposed on another one of the arrays. The light sources 112-3, 112-4, 112-5, and 112-1, 112-2 emitting the fifth and the sixth color beams C5 and C6 are respectively adjacent to each other. The light sources 112-6, 112-7, 112-8, and 112-9 may have the same wavelength, or the light colors thereof may be classified as the same light color with wavelengths being slightly different from each other.

Refer to FIG. 2A and FIG. 2B, in this embodiment, the first light guide module 120 includes a first light splitting element 122 and a second light splitting element 124. The first color light beam C1 from the first light source module 110A is transmitted to the second light guide module 130 after penetrating the first light splitting element 122. The second and the third color light beams C2-C3 from the first light source module 110A are transmitted to the second light guide module 130 after penetrating the second light splitting element 124. The first, the second, and the third color light beams C1, C2, and C3 may respectively be light beams of different light colors, such as red light, green light, and blue light beams, but the disclosure is not limited thereto.

In this embodiment, the fourth color light beam C4 from the second light source module 110B is reflected by the second light splitting element 124 to the second light guide module 130. The fifth and the sixth color light beams C5-C6 from the second light source module 110B are reflected by the first light splitting element 122 to the second light guide module 130. The fourth, the fifth, and the sixth color light beams C4, C5, and C6 may respectively be light beams of different light colors, such as red light, green light, and blue light beams, but the disclosure is not limited thereto.

Figure 4:
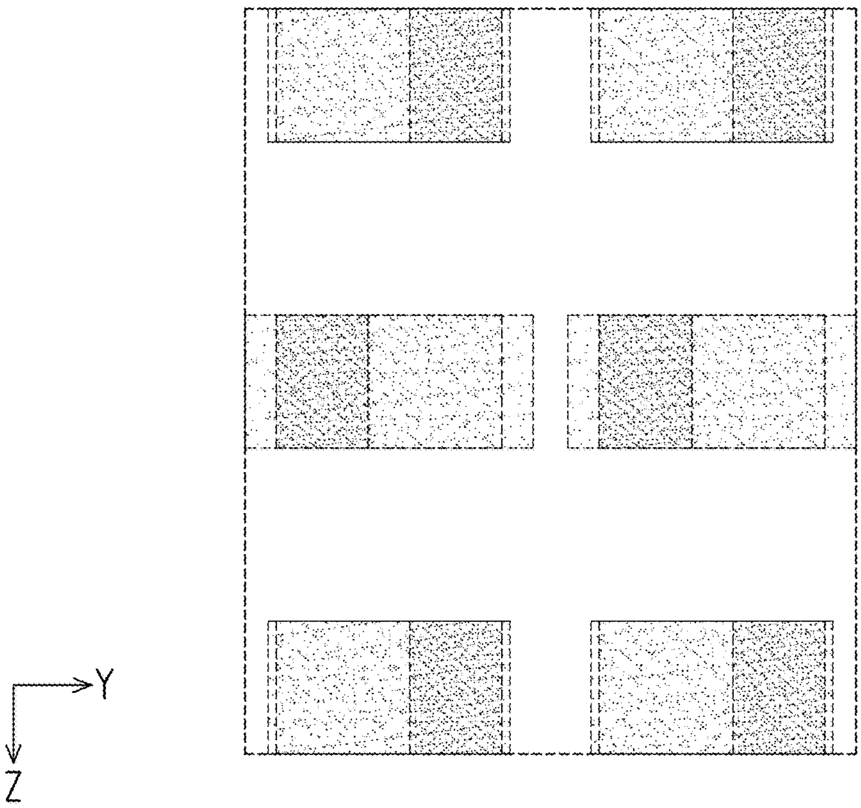
FIG. 4 is a schematic diagram of a light spot formed by a first sub-beam and a second sub-beam incident on a light incident surface of a condenser lens module in a projection device or an illumination system according to an embodiment of the disclosure.

In this embodiment, the second light guide module 130 is further configured to separate the first to the sixth color light beams C1-C6 respectively into a first sub-beam L1 and a second sub-beam L2, so that an aspect ratio of a light spot formed by the first sub-light beams and the second sub-light beams of the first to the sixth color light beams C1-C6 incident on a light incident surface 140S of the condenser lens module 140 falls within a range of 1 to 1.5 (for example, as shown in FIG. 4).

In this embodiment, the second light guide module 130 includes a transflective element 132 and a first reflector 134. The transflective element 132 is configured to separate the first to the sixth color light beams C1-C6 from the first light guide module 120 respectively into the first sub-beam L1 and the second sub-beam L2. The first sub-beam L1 is transmitted to the condenser lens module 140 after penetrating the transflective element 132. The second sub-beam L2 is sequentially reflected by the transflective element 132 and reflected by the first reflector 134 to be transmitted to the condenser lens module 140.

In this embodiment, the condenser lens module 140 may include a combination of one or more optical lenses with the refractive power. For example, FIG. 2A and FIG. 2B illustrate that the condenser lens module 140 includes lenses 142 and 144.

In this embodiment, the illumination system 100 further includes a lens array 160 disposed between the second light guide module 130 and the condenser lens module 140. The first sub-beam L1 and the second sub-beam L2 are transmitted to the condenser lens module 140 after penetrating the lens array 160.

In this embodiment, the illumination system 100 further includes a diffusion element 180. The diffusion element 180 is disposed between the condenser lens module 140 and the light homogenizing element 150 on the transmission path of the first sub-beam L1 and the second sub-beam L2. The diffusion element is, for example, a diffuser wheel.

FIG. 4 is a schematic diagram of a light spot formed by a first sub-beam and a second sub-beam incident on a light incident surface of a condenser lens module in a projection device or an illumination system according to an embodiment of the disclosure. Please refer to FIG. 2A, FIG. 2B, and FIG. 4 at the same time. In this embodiment, the first sub-beam L1 and the second sub-beam L2 are symmetrically incident on the light incident surface 140S with the central axis 140C of the light incident surface 140S of the condenser lens module 140. A distance between the first sub-beam L1 and the second sub-beam L (on the light incident surface 140S of the condenser lens module 140) is proportional to a distance of the transflective element 132 and the first reflector 134 in a radial direction (e.g. Y-axis direction) of the condenser lens module 140.

The aforementioned "proportional" means, for example, that the design of the distance between the transflective element 132 and the first reflector 134 in the radial direction of the condenser lens module 140 determines the length of one side of the light spot formed by the first sub-beam L1 and the second sub-beam L2 of the first to the sixth color light beams C1-C6 being incident on the light incident surface 140S of the condenser lens module 140, and determines the distance between the first sub-beam L1 and the second sub-beam. In an exemplary embodiment, by appropriately setting the distance between the transflective element 132 and the first reflector 134 in the radial direction of the condenser lens module 140, the aspect ratio of the light spot formed by the first sub-light beam L1 and the second sub-light beam L2 of the first to the sixth color light beams C1-C6 incident on the light incident surface 140S of the condenser lens module 140 may fall within a range of 1 to 1.3 or be close to 1.

Figure 5A:
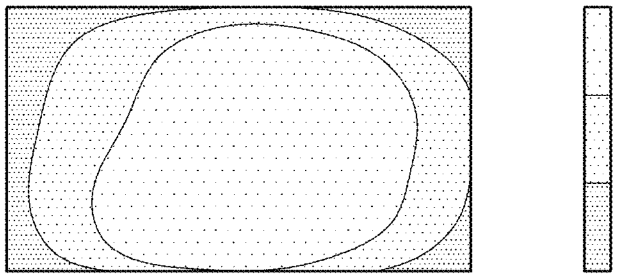
FIGS. 5A to 5C are schematic diagrams of an energy distribution of different color lights in an image beam respectively projected on a projection surface according to a projection device of an embodiment of the disclosure.
Figure 5B:
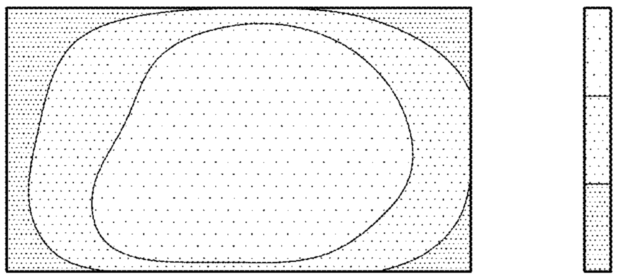
Figure 5C:
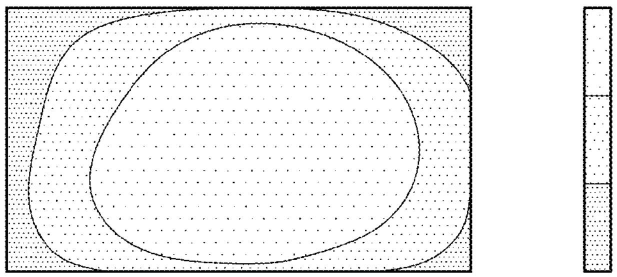

FIGS. 5A to 5C are schematic diagrams of an energy distribution of different color lights in the image beam respectively projected on a projection surface according to a projection device of an embodiment of the disclosure. FIG. 5A is from the first color light beam C1 or the fourth color light beam C4. FIG. 5B is from the second color light beam C2 or the fifth color light beam C5. FIG. 5C is from the third color light beam C3 or the sixth color beam C6.

Please refer to FIGS. 5A to 5C. Based on the above, in an embodiment of the disclosure, the illumination system 100 and the projection device 10 include the first light source module 110A, the second light source module 110B, the first light guide module 120, the second light guide module 130, the condenser lens module 140, and the light homogenizing element 150. The second light guide module 120 is configured to separate the first to the sixth color light beams C1-C6 respectively into a first sub-beam L1 and a second sub-beam L2, so that the aspect ratio of the light spot formed by the first sub-light beams L1 and the second sub-light beams L2 incident on the light incident surface 140S of the condenser lens module 140 falls within the range of 1 to 1.5. Since the aspect ratio of the light spot formed by the first sub-beams L1 and the second sub-beams L2 incident on the light incident surface 140S of the condenser lens module 140 falls within the range of 1 to 1.5, when the first sub-beam L1 and the second sub-beam L2 are incident on the light homogenizing element 150, the angles in all directions are more consistent (for example, the vertical and horizontal angles are both greater than 20 degrees), so that the light homogenizing element 150 has proper light homogenizing effect, thereby making the color of the illuminating light beam IL and the image beam IB more uniformed and making the energy distribution more consistent, as shown in FIGS. 5A to 5C.

Figure 6:
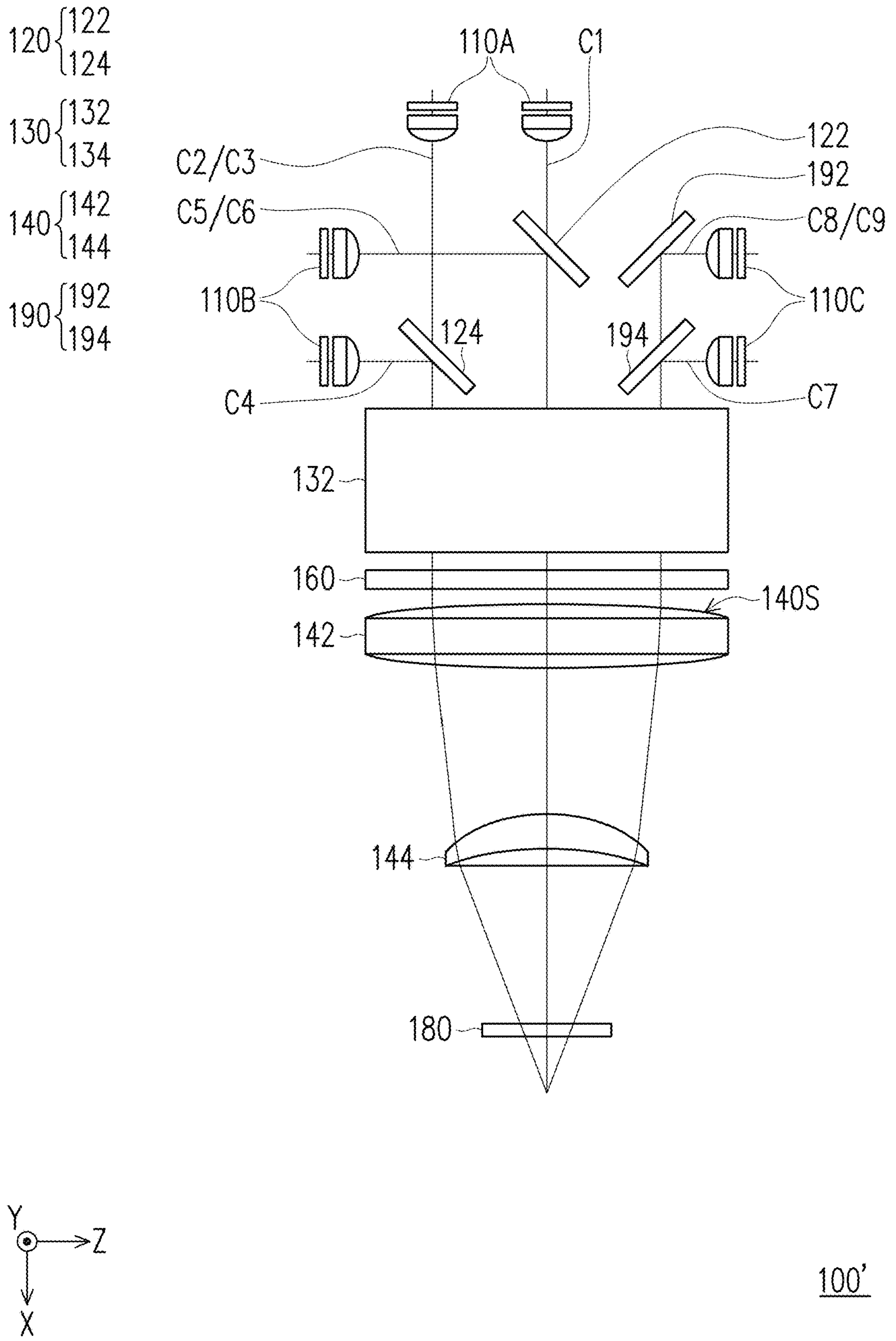
FIG. 6 is a schematic diagram of an illumination system according to the second embodiment of the disclosure.

FIG. 6 is a schematic diagram of an illumination system according to the second embodiment of the disclosure. Referring to FIG. 6, an illumination system 100' is similar to the illumination system 100 in FIG. 2A. The main difference is that the illumination system 100' further includes a third light source module 110C and a third light guide module 190. In this embodiment, the third light source module 110C is configured to generate a seventh color light beam C7, an eighth color light beam C8, and a ninth color light beam C9. The third light guide module 190 is disposed on a transmission path of the seventh to the ninth color light beams C7-C9 to transmit the seventh to the ninth color light beams C7-C9 from the third light source module 110C to the second light guide module 130.

Referring to FIG. 3, in this embodiment, the third light source module 110C may include the light sources 112-1, 112-2, 112-3, 112-4, 112-5, 112-6, 112-7, 112-8, and 112-9. The light sources 112-1, 112-2, 112-3, 112-4, 112-5, 112-6, 112-7, 112-8, and 112-9 are, for example, the laser diode (LD), the light-emitting diode (LED) light source or other suitable light sources. The light sources 112-1, 112-2, 112-3, 112-4, 112-5, 112-6, 112-7, 112-8, and 112-9 are arranged in two arrays. The light sources 112-6, 112-7, 112-8, and 112-9 emitting the seventh color light beam C7 are arranged on one of the arrays. The light sources 112-3, 112-4, 112-5 and 112-1, 112-2 emitting the eighth and the ninth color light beams C8 and C9 are arranged on another one of the arrays. The light sources 112-3, 112-4, 112-5 and 112-1, 112-2 emitting the eighth and the ninth color light beams C8 and C9 are respectively adjacent to each other.

Referring to FIG. 6 again, in this embodiment, the third light guide module 190 includes a third reflector 192 and a third light splitting element 194. The seventh color light beam C7 from the third light source module 110C is reflected by the third light splitting element 194 to the transflective element 132. The eighth and the ninth color light beams C8-C9 from the third light source module 110C are sequentially reflected by the third reflector 192 and transmitted to the transflective element 132 after penetrating the third light splitting element 194. The seventh, the eighth, and the ninth color light beams C7, C8, and C9 may respectively be light beams of different light colors, such as red light, green light, and blue light beams, but the disclosure is not limited thereto.

Based on the above, in an embodiment of the disclosure, the illumination system 100' and the projection device using the illumination system 100' further include the third light source module 110C and the third light guide module 190. Therefore, the illumination system 100' and the projection device may generate the illuminating light beam IL and the image beam IB with higher brightness. Moreover, the seventh, the eighth, and the ninth color light beams C7, C8, and C9 may be incident on the second light guide module 130 at different positions relative to the first to the sixth color light beams C1-C6. Therefore, the illumination light beam IL and the image beam IB have proper color uniformity. The remaining advantages of the illumination system 100' and the projection device using the illumination system 100' are similar to the advantages of the illumination system 100 and the projection device, which is not repeated herein.

Figure 7:
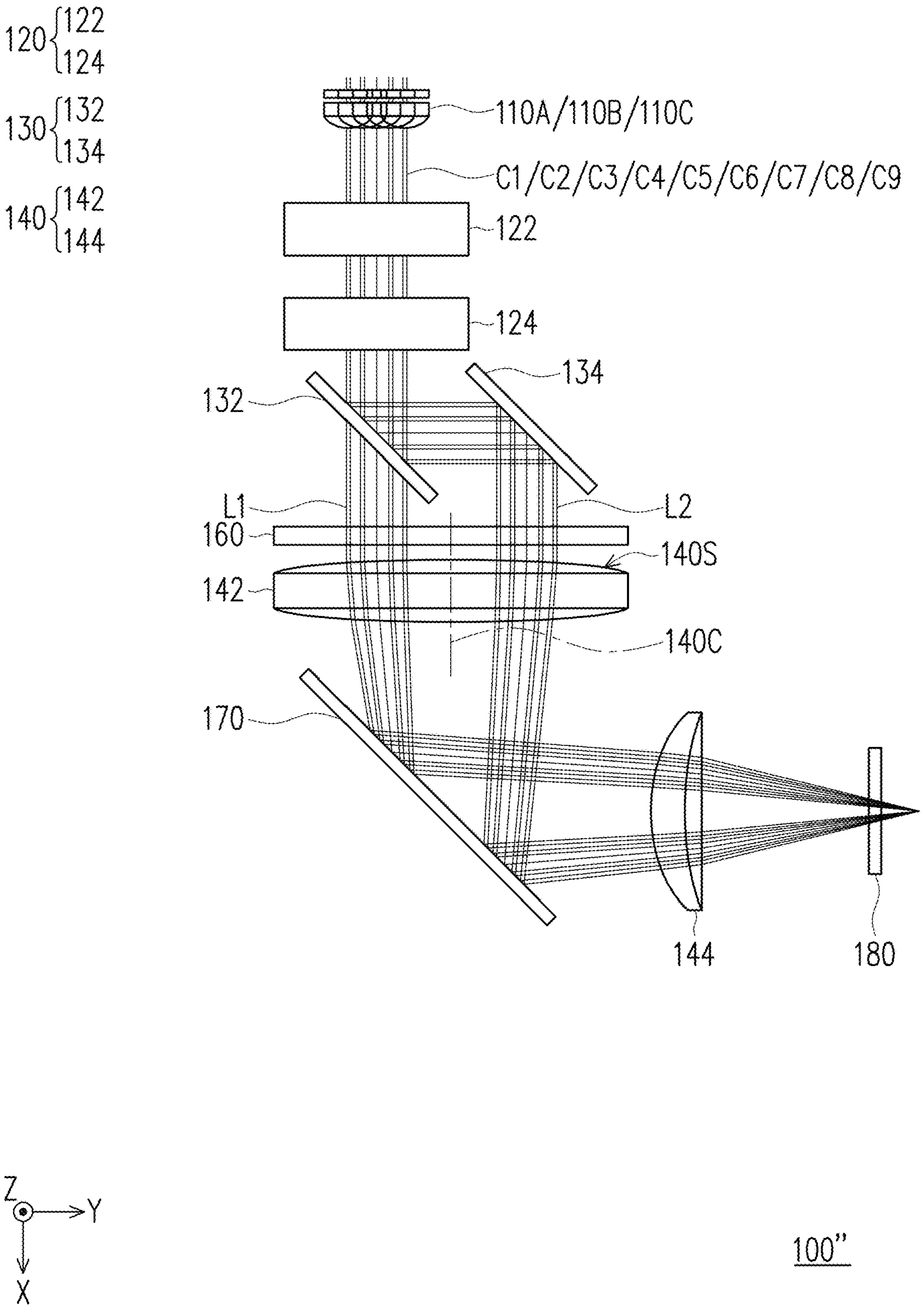
FIG. 7 is a schematic diagram of an illumination system according to the third embodiment of the disclosure.

FIG. 7 is a schematic diagram of an illumination system according to the third embodiment of the disclosure. Referring to FIG. 7, an illumination system 100" is similar to the illumination system 100 of FIG. 2B or the illumination system 100' of FIG. 6. The main difference is that the illumination system 100" further includes a second reflector 170. The condenser lens module 140 includes the lenses 142 and 144. The second reflector 170 is disposed between the lenses 142 and 144 on the transmission path of the first sub-beam L1 and the second sub-beam L2. The first sub-beam L1 and the second sub-beam L2 are emitted from the condenser lens module 140 after being reflected by the second reflector 170. Advantages of the illumination system 100'" are similar to advantages of the illumination system 100 of FIG. 2B or the illumination system 100' of FIG. 6, which is not repeated herein.

To sum up, in an embodiment of the disclosure, the illumination system and the projection device include the first light source module, the second light source module, the first light guide module, the second light guide module, the condenser lens module, and the light homogenizing element. The second light guide module is configured to separate the first to sixth color light beams respectively into the first sub-beam and the second sub-beam, so that the aspect ratio of the light spot formed by the first sub-light beams and the second sub-light beams incident on the light incident surface of the condenser lens module falls within the range of 1 to 1.5. Therefore, when the first sub-beam and the second sub-beam are incident on the light homogenizing element, the angles in each direction are more consistent, so that the light homogenizing element has proper light homogenizing effect, thereby making the color of the illuminating light beam IL and the image beam IB more uniformed and making the energy distribution more consistent.

What is claimed is:

1. An illumination system, configured to generate an illuminating light beam and comprising:

a first light source module, configured to generate a first color light beam, a second color light beam, and a third color light beam;

a second light source module, configured to generate a fourth color light beam, a fifth color light beam, and a sixth color light beam;

a first light guide module, disposed on a transmission path of the first to the sixth color light beams;

a second light guide module, disposed on the transmission path of the first to the sixth color light beams, wherein the first light guide module is configured to transmit the first to the sixth color light beams from the first light source module and the second light source module to the second light guide module;

a condenser lens module, disposed on the transmission path of the first to the sixth color light beams, wherein the second light guide module is configured to transmit the first to the sixth color light beams from the first light guide module to the condenser lens module; and a light homogenizing element, disposed on the transmission path of the first to the sixth color light beams, wherein the condenser lens module is configured to transmit the first to the sixth color light beams from the condenser lens module to the light homogenizing element, and the first to the sixth color light beams form the illuminating light beam after leaving the light homogenizing element, wherein the second light guide module is further configured to separate the first to the sixth color light beams respectively into a first sub-light beam and a second sub-light beam, so that an aspect ratio of a light spot formed by the first sub-beams and the second sub-beams of the first to the sixth color light beams incident on a light incident surface of the condenser lens module falls within a range of 1 to 1.5.

2. The illumination system according to claim 1, wherein the first light guide module comprises a first light splitting element and a second light splitting element, wherein the first color light beam from the first light source module is transmitted to the second light guide module after penetrating the first light splitting element, and the second and the third color light beams from the first light source module are transmitted to the second light guide module after penetrating the second light splitting element, wherein the fourth color light beam from the second light source module is reflected by the second light splitting element to the second light guide module, and the fifth and the sixth color beams from the second light source module are reflected by the first light splitting element to the second light guide module.

3. The illumination system according to claim 1, wherein the second light guide module comprises a transflective element and a first reflector, wherein the transflective element is configured to separate the first to the sixth color light beams from the first light guide module respectively into the first sub-beam and the second sub-beam, the first sub-beams are transmitted to the condenser lens module after penetrating the transflective element, and the second sub-beams are sequentially reflected by the transflective element and reflected by the first reflector to be transmitted to the condenser lens module.

4. The illumination system according to claim 3, wherein a distance of the first sub-beam and the second sub-beam is proportional to a distance of the transflective element and the first reflector in the radial direction of the condenser lens module.

5. The illumination system according to claim 3, further comprising:

a third light source module, configured to generate a seventh color light beam, an eighth color light beam, and a ninth color light beam; and a third light guide module, disposed on a transmission path of the seventh to the ninth color light beams to transmit the seventh to the ninth color light beams from the third light source module to the second light guide module.

6. The illumination system according to claim 5, wherein the third light guide module comprises a third reflector and a third light splitting element, wherein the seventh color light beam from the third light source module is reflected by the third light splitting element to the transflective element, and the eighth and the ninth color light beams from the third light source module are sequentially reflected by the third reflector and transmitted to the transflective element after penetrating the third light splitting element.

7. The illumination system according to claim 1, further comprising:

a lens array, disposed between the second light guide module and the condenser lens module, wherein the first sub-beams and the second sub-beams are transmitted to the condenser lens module after penetrating the lens array.

8. The illumination system according to claim 1, further comprising:

a second reflector, wherein the condenser lens module comprises a plurality of lenses, the second reflector is disposed between the plurality of lenses on the transmission path of the first sub-beams and the second sub-beams, the first sub-beams and the second sub-beams are emitted from the condenser lens module after being reflected by the second reflector.

9. The illumination system according to claim 1, further comprising:

a diffusion element, disposed between the condenser lens module and the light homogenizing element on the transmission path of the first sub-beams and the second sub-beams.

10. The illumination system according to claim 1, wherein the first sub-beams and the second sub-beams are symmetrically incident on the light incident surface with a central axis of the light incident surface of the condenser lens module.

11. A projection device, configured to generate an image beam and comprising:

a illumination system, configured to generate an illuminating light beam and comprising:

a first light source module, configured to generate a first color light beam, a second color light beam, and a third color light beam;

a second light source module, configured to generate a fourth color light beam, a fifth color light beam, and a sixth color light beam;

a first light guide module, disposed on a transmission path of the first to the sixth color light beams;

a second light guide module, disposed on the transmission path of the first to the sixth color light beams, wherein the first light guide module is configured to transmit the first to the sixth color light beams from the first light source module and the second light source module to the second light guide module;

a condenser lens module, disposed on the transmission path of the first to the sixth color light beams, wherein the second light guide module is configured to transmit the first to the sixth light beams from the first light guide module to the condenser lens module; and a light homogenizing element, disposed on the transmission path of the first to the sixth color light beams, wherein the condenser lens module is configured to transmit the first to the sixth color light beams from the condenser lens module to the light homogenizing element, and the first to the sixth color light beams form the illuminating light beam after leaving the light homogenizing element, wherein the second light guide module is further configured to separate the first to the sixth color light beams respectively into a first sub-beam and a second sub-beam, so that an aspect ratio of a light spot formed by the first sub-beams and the second sub-beams of the first to the sixth color light beams incident on a light incident surface of the condenser lens module falls within a range of 1 to 1.5;

a light valve, disposed on the transmission path of the illuminating light beam to convert the illuminating light beam into the image beam; and a projection lens, disposed on the transmission path of the image beam and configured to project the image beam out of the projection device.

12. The projection device according to claim 11, wherein the first light guide module comprises a first light splitting element and a second light splitting element, wherein the first color light beam from the first light source module is transmitted to the second light guide module after penetrating the first light splitting element, and the second and the third color light beams from the first light source module are transmitted to the second light guide module after penetrating the second light splitting element, wherein the fourth color light beam from the second light source module is reflected by the second light splitting element to the second light guide module, and the fifth and the sixth color light beams from the second light source module are reflected by the first light splitting element to the second light guide module.

13. The projection device according to claim 11, wherein the second light guide module comprises a transflective element and a first reflector, wherein the transflective element is configured to separate the first to the sixth color light beams from the first light guide module respectively into the first sub-beam and the second sub-beam, the first sub-beams are transmitted to the condenser lens module after penetrating the transflective element, and the second sub-beams are sequentially reflected by the transflective element and reflected by the first reflector to be transmitted to the condenser lens module.

14. The projection device according to claim 13, wherein a distance of the first sub-beam and the second sub-beam is proportional to a distance of the transflective element and the first reflector in the radial direction of the condenser lens module.

15. The projection device according to claim 13, further comprising:

a third light source module, configured to generate a seventh color light beam, an eighth color light beam, and a ninth color light beam; and a third light guide module, disposed on the transmission path of the seventh to the ninth color light beams to transmit the seventh to the ninth color light beams from the third light source module to the second light guide module.

16. The projection device according to claim 15, wherein the third light guide module comprises a third reflector and a third light splitting element, wherein the seventh color light beam from the third light source module is reflected by the third light splitting element to the transflective element, and the eighth and the ninth color light beams from the third light source module are sequentially reflected by the third reflector and transmitted to the transflective element after penetrating third light splitting element.

17. The projection device according to claim 11, further comprising:

a lens array, disposed between the second light guide module and the condenser lens module, wherein the first sub-beams and the second sub-beams are transmitted to the condenser lens module after penetrating the lens array.

18. The projection device according to claim 11, further comprising:

a second reflector, wherein the condenser lens module comprises a plurality of lenses, the second reflector is disposed between the plurality of lenses on the transmission path of the first sub-beams and the second sub-beams, the first sub-beams and the second sub-beams are emitted from the condenser lens module after being reflected by the second reflector.

19. The projection device according to claim 11, further comprising:

a diffusion element, disposed between the condenser lens module and the light homogenizing element on the transmission path of the first sub-beams and the second sub-beams.

20. The projection device according to claim 11, wherein the first sub-beams and the second sub-beams are symmetrically incident on the light incident surface with a central axis of the light incident surface of the condenser lens module.

* * * * *